United States Patent [19]

Olson et al.

[11] Patent Number: 5,170,182

[45] Date of Patent: Dec. 8, 1992

[54] APPARATUS AND METHOD FOR REGISTERING AN IMAGE ON A RECORDING MEDIUM

[75] Inventors: Thor A. Olson, Minneapolis; Richard A. Keeney, Eagan, both of Minn.

[73] Assignee: Management Graphics, Inc., Minneapolis, Minn.

[21] Appl. No.: 912,008

[22] Filed: Jul. 10, 1992

Related U.S. Application Data

[63] Continuation of Ser. No. 572,058, Aug. 23, 1990, abandoned.

[51] Int. Cl.$^5$ .................. G01D 9/42; G01D 15/14; G01D 5/84
[52] U.S. Cl. .................. 346/110 R; 346/108; 346/160; 358/347
[58] Field of Search .................. 346/1.1, 110 R, 110 V, 346/108, 76 L, 161, 107 R, 160; 355/20, 38, 41; 354/6, 76; 358/298, 244, 345, 347; 356/375, 138, 150

[56] References Cited

U.S. PATENT DOCUMENTS

| | | | |
|---|---|---|---|
| 3,137,768 | 6/1964 | Mullin | 346/110 R |
| 3,221,337 | 11/1965 | Quinn et al. | 346/110 R |
| 3,968,404 | 7/1976 | Vidal | 315/398 |
| 4,104,680 | 8/1978 | Holland | 358/347 |
| 4,707,710 | 11/1987 | Shinada | 346/108 |
| 4,754,334 | 6/1988 | Kriz et al. | 358/244 |
| 4,768,043 | 8/1988 | Saito et al. | 346/108 |
| 4,823,204 | 4/1989 | Holland | 358/347 |
| 4,980,781 | 12/1990 | Yamamoto et al. | 358/474 |

FOREIGN PATENT DOCUMENTS 3133464 8/1981 Fed. Rep. of Germany.

OTHER PUBLICATIONS

Japanese Patent Application Abstract, Application No. JP87031659, Patent Abstracts of Japan, vol. 13, No. 429 (E-823), Sep. 25, 1989.

*Primary Examiner*—Benjamin R. Fuller
*Assistant Examiner*—David Yockey
*Attorney, Agent, or Firm*—Barry R. Lipsitz

[57] ABSTRACT

Registration of an image with respect to a recording medium in a film recorder or the like is provided by first roughly positioning the recording medium in a support. A beam is then scanned across an unused portion of the recording medium until it impinges a fixed reference mark such as a sprocket hole edge. The coordinates of the beam are determined at the reference mark, and a registration signal is computed therefrom. The beam is then scanned across the recording medium in response to the registration signal to record information in registered relation to the reference mark. An intensity profile of the beam is calculated as it passes over an edge of the recording medium. The focus of the beam is then adjusted according to the intensity profile. Adjustment of both beam focus and lens focus is provided.

21 Claims, 4 Drawing Sheets

APPARATUS AND METHOD FOR REGISTERING AN IMAGE ON A RECORDING MEDIUM

This application is a continuation of commonly assigned, copending U.S. patent application Ser. No. 07/572,058 filed Aug. 23, 1990 now abandoned.

BACKGROUND OF THE INVENTION

The present invention relates to the recording of information using a scanning beam, and more particularly to the registration of image information on a recording medium such as photographic film.

Various systems are well known for recording information on different media. For example, a simple camera records image information on photographic film. In a more sophisticated setting, light beams such as those produced by cathode ray tubes ("CRT") or lasers are scanned line-by-line across photographic film to produce an image. An example of such apparatus can be found in an "image recorder" used to expose film with computer generated images for the production of slides, transparencies, photographs, and the like. An image recorder must be precisely controlled to provide high quality imaging that is consistent on a frame-by-frame basis. Consistency is particularly important for slides that are to be part of a multi-image program using two or more projectors to fade one slide into the next or simultaneously project a plurality of slides that must line up precisely. This requires consistency of both centering and frame-to-frame registration. In cinematographic applications, frame-to-frame misregistration of only a few pixels would result in substantial bounce in the projected image. Precise registration is therefore imperative.

Known image recorders, such as those sold under the trademark "Solitaire" by Management Graphics, Inc. of Minneapolis, Minn., U.S.A., typically include a CRT for producing a beam, a deflection system for scanning the beam across the face of the CRT, a system control and central processor unit ("CPU") for controlling the deflection system, and a camera (i.e., "film transport"). The latter component includes a film transport body, lens, lens mounting assembly, aperture plate, film plane, and film transport mechanism. An image to be recorded is first written on the phosphor of the CRT by deflecting an electron beam in a raster pattern and modulating the intensity of the beam. This process is analogous to the creation of a television picture. Alternately, the image can be written on the CRT using well known time modulation techniques, wherein the beam intensity is constant but the time the beam is kept at each point is varied depending on the exposure required. Time modulation exposure is slower, but generally results in a sharper image.

The resulting pattern (the "object image") on the CRT is optically imaged onto photographic film by the camera, which contains the required optics and mechanism to advance the film to successive frames. A key requirement of the camera is that it hold the film accurately at the film plane so that the CRT image is placed at the proper location on the film. In other words, the object image must be centered, have the proper size, be in focus, and not be rotated with respect to the film path.

In order to provide proper registration (i.e., centering and rotation) of an image on the film, known image recorders typically advance the film within the transport using an expensive, complicated and highly precise mechanism that locks each frame of the film into proper orientation with respect to the transport by placing locating pins into sprocket holes provided in the film. The locating pins must be tediously aligned with respect to the CRT object image prior to the commencement of image recording. To accomplish this, the pins must first be aligned to the aperture and film within the film transport. Then, the transport must be separately aligned to the CRT.

One way to align the transport to the CRT has been to center the transport over the CRT using adjusting screws. The film plane and lens mount are adjusted by means of mechanical shims, and the lens is refocused to achieve the desired image. A test roll of film is exposed on a frame-by-frame basis, with each frame corresponding to different mechanical adjustment settings. A log is kept as to the settings for each frame. After the film is developed, the best settings are determined, and used as a starting point for another iteration of the entire process. It can take many trial and error settings to obtain the required alignment, and the whole process often takes as long as sixteen hours or more. Once the film transport to CRT alignment has been set, rotation is held fixed by the alignment pins in the transport, and image orientation is guaranteed by the tolerances of the mechanical components in the prealigned transport assembly.

A disadvantage of such a manual alignment process, in addition to its complexity and cost, is that the film transport may not be interchanged with another without having to go through most of the alignment process again. Also, the alignment of an image recorder may not survive mechanical shocks, such as being dropped during shipping or jarring occurring during or after the apparatus is unpacked. Still further, known image recorders require an extremely precise gear mechanism in the film transport to prevent the film from tearing when the registration pins are inserted. The associated mechanism for coupling and subsequently decoupling the film with the pins is also complicated and expensive.

It would be advantageous to provide a method and apparatus for registering an image on a recording medium without the need to tediously align the film transport and the beam source (e.g., CRT). It would be further advantageous for such a method and apparatus to provide for image registration without the need for expensive and complex mechanical mechanisms, such as sprocket hole locating pins. Such a system should also enable any film transport module to be interchanged on the film recorder without the need for mechanical realignment.

The present invention provides an apparatus and method having the aforementioned advantages.

SUMMARY OF THE INVENTION

In accordance with the present invention, a method and apparatus are provided for registering an image on a recording medium. The recording medium is moved into a general operating position and fixed. A beam is scanned across an unused portion of the recording medium until it impinges a fixed reference mark such as a sprocket hole. The coordinates of the beam at the reference mark are determined, and a registration signal is computed from the coordinates. The beam is then scanned across the recording medium in response to the registration signal to record information in registered relation to the reference mark.

Information may be registered with respect to the reference mark along either or both the length and width of the recording medium. The information can also be rotationally registered on the recording medium with respect to the reference mark. It will be appreciated that a plurality of reference marks can be used to achieve a desired result, and multiple marks may be required to calculate a particular registration signal.

In order to provide automatic focusing together with image registration, the beam is scanned across an edge of the recording medium, such as the edge of a sprocket hole. An intensity profile of the beam is calculated as it passes over the edge. The focus of the beam is then adjusted according to the intensity profile. The focus adjustment can be made by rendering the beam more coherent with an electrical input to the CRT or other beam generator. This is referred to as "beam focus". Focus can also be adjusted by moving an optical lens in the path of the beam to provide "lens focus".

The system of the present invention uses the same beam for detecting the reference mark and subsequently writing information on the recording medium. Since the same beam is used for both purposes, without the use of intervening optics to perform the scan function, a high degree of precision is provided.

DETAILED DESCRIPTION OF THE INVENTION

Figure 1:
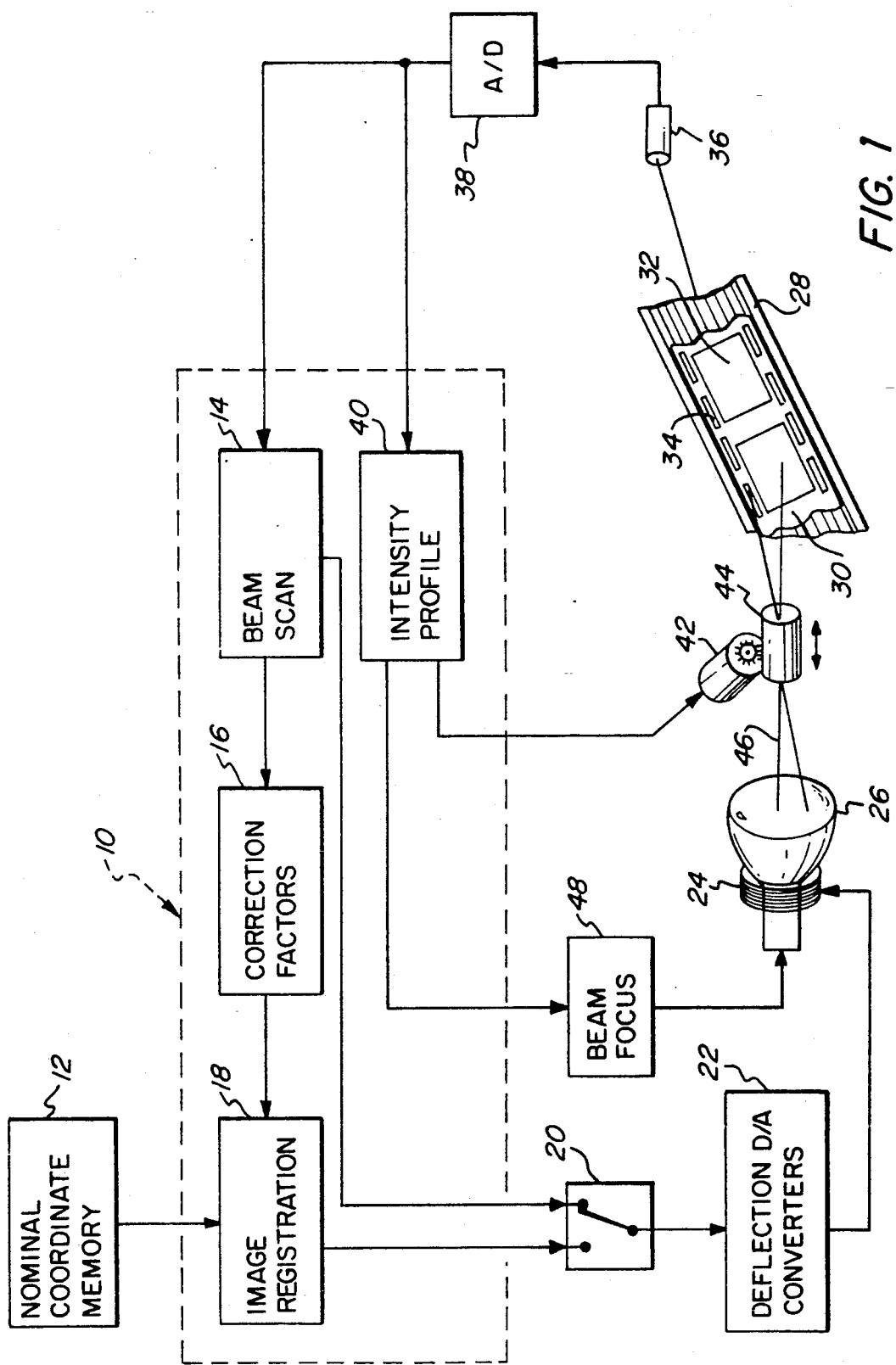
FIG. 1 is a block diagram of apparatus in accordance with the present invention.

Apparatus in accordance with the present invention is illustrated in FIG. 1. The apparatus provides registration of images produced by a CRT 26 on frames 32 of a recording medium 30, such as photographic film. Those skilled in the art will appreciate that imaging can also be provided by beam sources other than CRT 26. For example, a laser can be used. Similarly, other recording mediums, such as a thermally responsive medium, can be substituted for film 30.

Image registration on film 30 is provided without any mechanical or manual electronic adjustments. At the same time, camera module interchangeability is provided. Registration corrections can occur on a frame-by-frame basis. Thus, the film advance mechanism (not shown) does not have to be highly precise or repeatable. All that is required is a support, such as guide channel 28, for holding the recording medium in a rough registration position within the compensation range of the system.

Information concerning the actual position of film 30 is obtained using the deflection system that moves the beam. In the embodiment illustrated, a yoke 24 is provided for moving beam 46 to a desired position on the face of CRT 26. The magnetic deflection of electron beams in this manner is well known in the art.

Yoke 24 is driven by deflection digital-to-analog converters 22, that obtain digital deflection signals from a microcomputer generally designated 10 and convert the signals to analog form for energizing yoke 24 in a conventional manner. Data indicative of the position of film 30 is obtained using a photosensor 36 located behind the film plane. In accordance with the present invention, beam 46 is positioned on the CRT so that its image at the film plane falls on a fixed reference mark in the unused portion of the film. In a preferred embodiment, film sprockets 34 are used as the fixed reference mark. The position of the beam when it impinges various edges of one or more sprocket holes is then noted by microcomputer 10, and used to obtain the digital deflection parameters for properly registering an image subsequently scanned by the beam onto a frame 32 of the film.

It is important, of course, that when beam 46 is scanned to locate a sprocket hole 34, it is not inadvertently passed over any portion of a frame 32. This assures that the image area of the film is not exposed during the registration process. The film in the area around the sprocket holes will be exposed, and when developed will bear the marks of the registration process. Since it is not in the image area, this is of no consequence.

Sprocket holes 34 are convenient for use as the fixed reference mark to provide image registration. Many roll films have precisely located sprocket holes for use in transporting the film to the next frame. Standards exist that specify the desired image location with respect to these sprocket holes. Since unexposed film is practically opaque, the edges of the sprocket holes provide suitable targets for sensing the position of the film in connection with the present invention.

Figure 2:
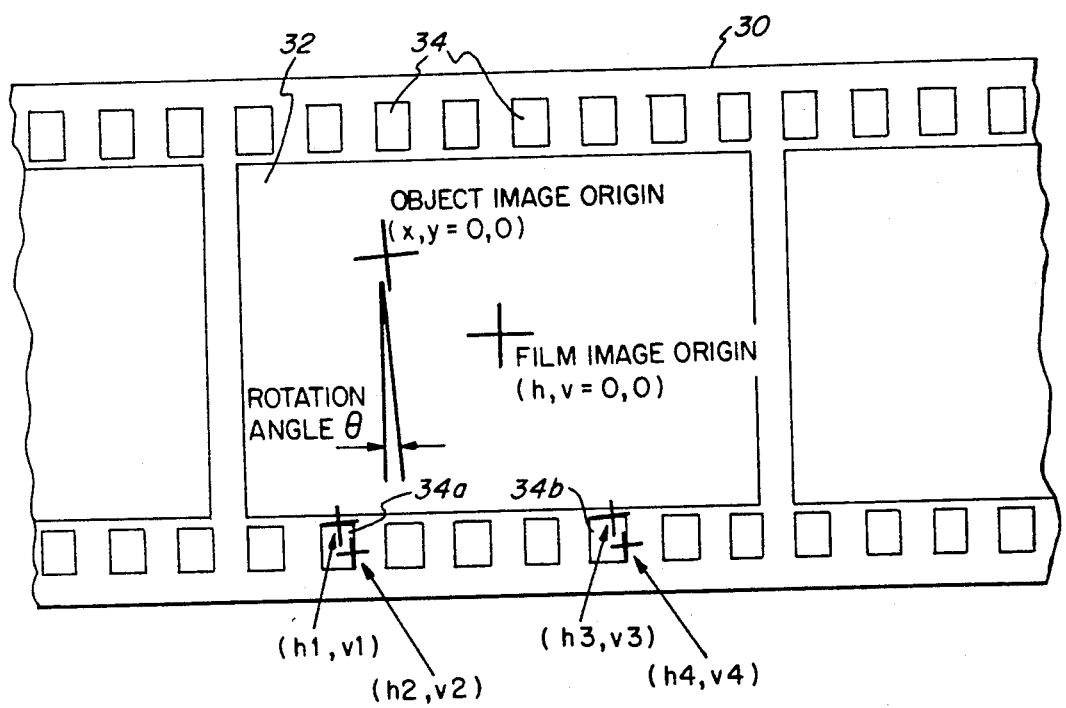
FIG. 2 is an illustration of a section of photographic film, showing how coordinates can be measured from sprocket holes in accordance with the present invention.

FIG. 2 provides an illustration of the geometry that can be used to relate a sprocket hole to a frame on the film for registration of an image. In order to effect registration, the mapping between the object image coordinates (at the face of the CRT) to the film image coordinates must be determined. There is also a mapping from deflection control signals to the object image coordinates, the specifics of which are disclosed in commonly assigned U.S. Pat. No. 4,754,334 issued on Jun. 28, 1988 for "Image Recorder Having Automatic Alignment Method and Apparatus", incorporated herein by reference.

In order to map the object image coordinates to the film image coordinates, film 30 must have sprocket holes in precisely known locations with respect to the center of the desired image. The film plane coordinates, denoted by the pair (h,v), has its origin (o,o) at the image center. The object coordinates are referred to as locations (x, y) at the CRT. The object image plane ("object plane") has an origin which usually does not coincide with the film image origin. In fact, the film coordinates are a scaled, rotated, and offset version of the object coordinates. This mapping can be represented as a concatenated series of linear transformations:

$$\begin{bmatrix} h \\ v \\ 1 \end{bmatrix} =$$

-continued $$\begin{bmatrix} 1 & 0 & C_h \\ 0 & 1 & C_v \\ 0 & 0 & 1 \end{bmatrix} \begin{bmatrix} r_{11} & -r_{21} & 0 \\ r_{21} & r_{11} & 0 \\ 0 & 0 & 1 \end{bmatrix} \begin{bmatrix} s & 0 & 0 \\ 0 & s & 0 \\ 0 & 0 & 1 \end{bmatrix} \begin{bmatrix} x \\ y \\ 1 \end{bmatrix}$$

translation    rotation    scaling where:
- s is the scale factor between the two coordinate systems,
- $C_h$ and $C_v$, are the offset distances between the two origins,
- $r_{11}$ and $r_{21}$ are rotation factors: $r_{11} = \cos(\Theta)$, $r_{21} = \sin(\Theta)$.

When these matrices are multiplied together:

$$\begin{bmatrix} h \\ v \\ 1 \end{bmatrix} = \begin{bmatrix} sr_{11} & -sr_{21} & C_h \\ sr_{21} & sr_{11} & C_v \\ 0 & 0 & 1 \end{bmatrix} \begin{bmatrix} x \\ y \\ 1 \end{bmatrix}$$

or, to simplify notation slightly:

$$\begin{bmatrix} h \\ v \\ 1 \end{bmatrix} = \begin{bmatrix} t_{11} & -t_{21} & t_{13} \\ t_{21} & t_{11} & t_{23} \\ 0 & 0 & 1 \end{bmatrix} \begin{bmatrix} x \\ y \\ 1 \end{bmatrix}$$

There are four unknowns in this system of equations, the four unique elements of the "t" matrix. They can be obtained by making four measurements, for example, the locations of the horizontal and vertical edges of sprocket holes 34a and 34b in the film. These four measurements obtain $x_1$, $y_1$ through $x_4$, $y_4$ for the film locations $h_1$, $v_1$ through $h_4$, $v_4$. Although this seems like eight conditions, only the precise locations of $v_1$, $h_2$, $v_3$, and $h_4$ are known since the remaining coordinates are not defined by an edge of the corresponding sprocket hole. The four equations that result are:

$$v_1 = t_{21}x_1 + t_{11}y_1 + t_{23}$$

$$v_3 = t_{21}x_3 + t_{11}y_3 + t_{23}$$

$$h_2 = t_{11}x_2 - t_{21}y_2 + t_{13}$$

$$h_4 = t_{11}x_4 - t_{21}y_4 + t_{13}$$

which can be written:

$$\begin{bmatrix} v_1 \\ h_2 \\ v_3 \\ h_4 \end{bmatrix} = \begin{bmatrix} y_1 & x_1 & 0 & 1 \\ x_2 & -y_2 & 1 & 0 \\ y_3 & x_3 & 0 & 1 \\ x_4 & -y_4 & 1 & 0 \end{bmatrix} \begin{bmatrix} t_{11} \\ t_{21} \\ t_{13} \\ t_{23} \end{bmatrix}$$

or, defining the "measurement matrix", M:

$$\begin{bmatrix} v_1 \\ h_2 \\ v_3 \\ h_4 \end{bmatrix} = M \begin{bmatrix} t_{11} \\ t_{21} \\ t_{13} \\ t_{23} \end{bmatrix}$$

The solution for the elements of t is:

$$\begin{bmatrix} t_{11} \\ t_{12} \\ t_{13} \\ t_{23} \end{bmatrix} = M^{-1} \begin{bmatrix} v_1 \\ h_2 \\ v_3 \\ h_4 \end{bmatrix}$$

The desired mapping parameters s, $\Theta$, $C_h$ and $C_v$ are obtained by:

$$C_h = t_{13}$$
$$C_v = t_{23}$$

$$\Theta = \arctan\left(\frac{t_{21}}{t_{11}}\right)$$

$$s = \sqrt{t_{11}^2 + t_{21}^2}$$

These are the parameters needed by the deflection system to properly position the object image in order to result in a correct film image placement. Normally, unless poor choices of measurement locations are made, the measurement matrix M will be invertible by conventional means.

The mapping parameters $C_h$, $C_v$, $\Theta$, and s are real world numbers (e.g., expressed in inches and degrees) that are used to correct the object coordinates (x, y) so that the image produced by the CRT will be oriented on the CRT in a location to provide proper registration (h, v) on film frame 32.

To actually measure the locations of these sprocket hole edges, photodetector 36 (FIG. 1) is placed immediately behind the nominal location of the sprocket hole when the film is roughly aligned in guide 28. The output of photodetector 36 is converted from analog form to a digital signal by analog-to-digital converter 38. The digital data is input to a beam scan processor 14 in microcomputer 10. The beam scan processor contains a search algorithm that produces an output signal for deflecting the beam to find the sprocket holes. The output signal is coupled to deflection D/A converters 22, via a switch 20, when the system is in the registration mode. The beam is scanned across the edge of the sprocket hole, and when photodetector 36 determines that the beam spot is eclipsed by the sprocket hole edge, the deflection value at that location is input by beam scan processor 14 to a correction factors processor 16. Processor 16 computes a registration signal containing correction factors from the coordinate data provided by beam scan processor 14, and forwards the registration signal to an image registration processor 18.

When the system is used in the image recording mode, switch 20 is actuated to input deflection data from image registration processor 18 to deflection D/A converters 22. The image registration processor receives nominal coordinate data from a read-only memory 12, and applies the correction factors received from correction factor processor 16 to generate the corrected deflection signals required for properly scanning the beam. When corrected in this manner, the deflection signals will scan the beam across a frame 32 of film 30 to record an image thereon in registered relation to the sprocket hole 34.

It should be appreciated that the nominal coordinates stored in memory 12 are those that would provide a perfectly registered image on film 30 if the film were mechanically pre-registered in a precise fashion using mechanical means such as the sprocket hole pin registration provided in the prior art. Since film 30 is only roughly aligned within guide 28 in accordance with the present invention, microcomputer 10 corrects the nominal coordinates, in accordance with actual sprocket hole coordinates detected via photodetector 36, to provide a properly registered image on the film.

Figure 3:
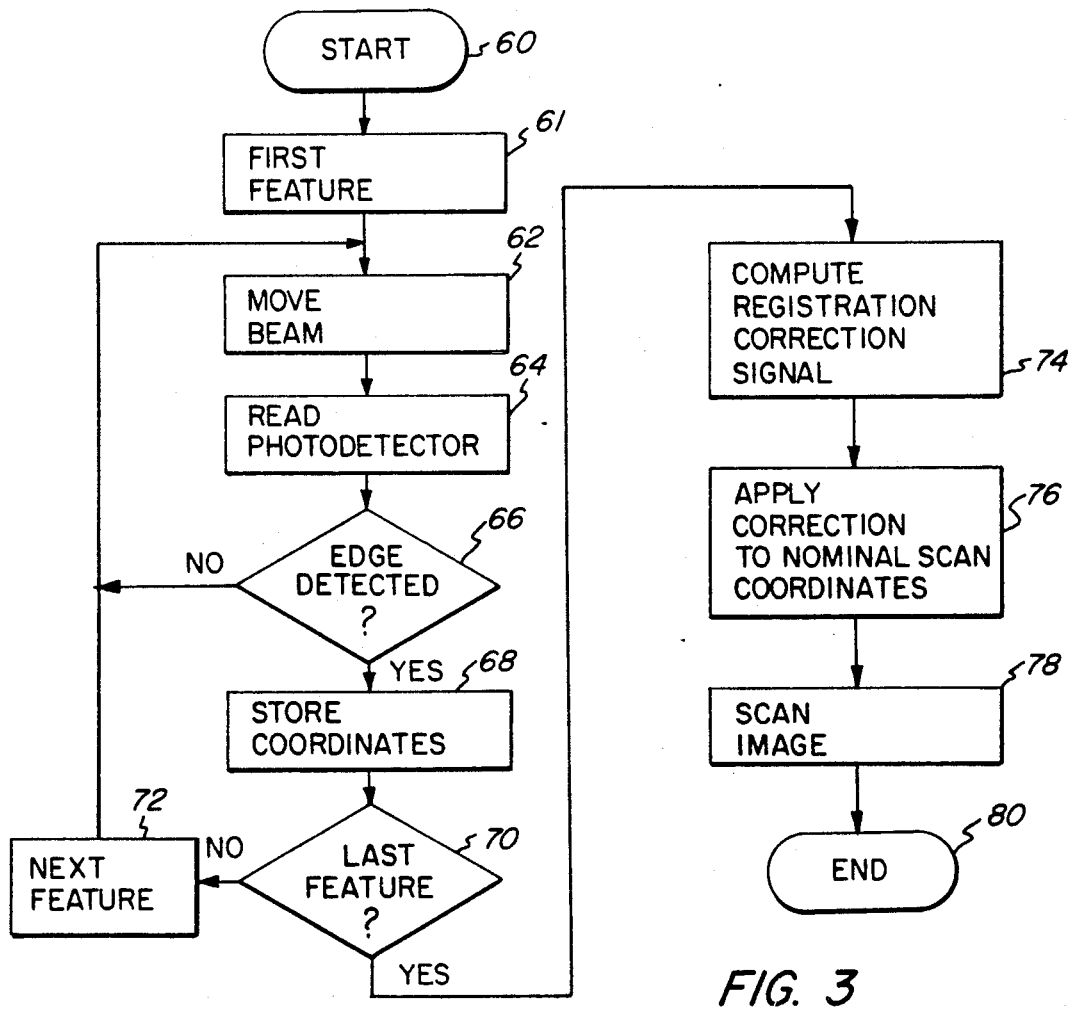
FIG. 3 is a flowchart illustrating a routine used by the apparatus of FIG. 1 to register an image on a recording medium.

FIG. 3 is a flowchart of an algorithm used by microcomputer 10 in determining the proper coordinates for scanning an image to be recorded. The routine starts at box 60, and control passes to box 61 where nominal coordinates for the first feature (e.g., sprocket hole edge) to be located are identified. Then, working from the identified nominal coordinates, beam scan processor 14 commences to move the beam across an unused portion of film 30 (i.e., along the film edge containing the sprocket holes) as indicated at box 62 to locate the sprocket hole edge. As the beam is scanned along the edge of the film, the output of photodetector 36 is monitored to determine when light from the beam passes through the sprocket hole (box 64). As the beam passes over the sprocket hole edge, photodetector 36 will generate an analog signal (e.g., a voltage) that is input to A/D converter 38 and applied to beam scan processor 14 in digital form. Since the beam scan processor is the component that moves the beam across the unused portion of the film, it knows at all times the coordinates at which the beam is located.

Upon edge detection at box 66 of FIG. 3, control passes to box 68 where beam scan processor 14 stores the coordinates of the beam. Then, at box 70, a determination is made as to whether the edge just detected is the last coordinate position ("last feature") necessary for the computation of the mapping parameters $C_h$, $C_v$, $\Theta$, and s described above. If not, control passes to box 72 and beam scan processor 14 is incremented to move the beam for detection of the next edge necessary for the mapping parameter computation. When all of the necessary features have been obtained, control passes from box 70 to box 74 where correction factor processor 16 computes a "registration correction signal" that contains the correction factors needed by image registration processor 18 to correct the nominal scan coordinates. The correction factors are applied by the image registration processor to the nominal scan coordinates at box 76 to provide the correct scan coordinates necessary for proper image registration on the film. Then, the image is scanned on CRT 26 as indicated at box 78. The routine ends at box 80. Since the deflection signals used to scan the image are derived from the corrected scan coordinates, the image will be properly registered on film 30 with respect to the sprocket(s) 34 monitored by photodetector 36.

Figure 4:
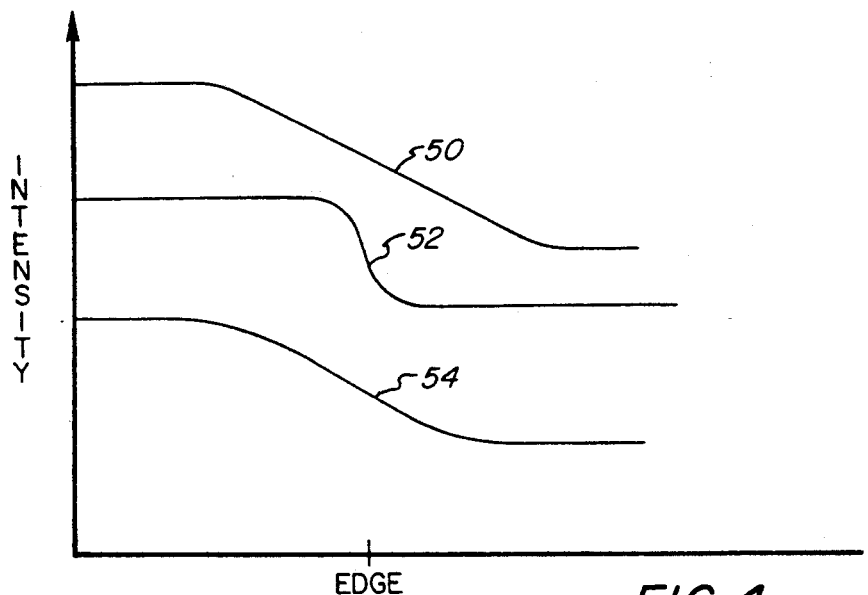
FIG. 4 is a graphical illustration of various intensity profiles used for focusing.

The present invention also provides for the focusing of the beam using an edge of the film, such as an edge of a sprocket hole 34. Both beam focus and lens focus can be accommodated, although beam focus can alternately be obtained by adjusting the beam for the greatest contrast. As illustrated in FIG. 4, the slope of the intensity profile of a beam as it crosses an edge increases with the sharpness of the beam. In other words, a wide, unfocused beam will scatter as it crosses an edge, and light detected by a photodetector mounted to view the light passing across the edge will have a gradual intensity profile such as that shown by curves 50, 54 in FIG. 4. A focused, coherent beam on the other hand, will approach an edge (e.g., the almost opaque edge of a film sprocket hole) without passing any substantial light until the beam is actually right at the edge. The intensity profile of a focused beam therefore has a sharp cutoff, as indicated by curve 52 of FIG. 4. This phenomenon can be used to determine whether a spot of light is properly focused.

By monitoring a beam through several iterations as it passes across an edge after its focus is readjusted, and comparing the slopes of the intensity profiles of each iteration, the adjustment providing the best focus is easily obtained. In the apparatus illustrated in FIG. 1, the intensity profile is computed by an intensity profile processor 40, that receives and monitors the magnitude of the digitized output from photodetector 36. Beam focus is controlled using conventional CRT focusing circuitry 48. Lens focus is controlled via a focusing lens 44 that is moved along the path of the beam by a motor 42 or equivalent mechanical structure.

Figure 5:
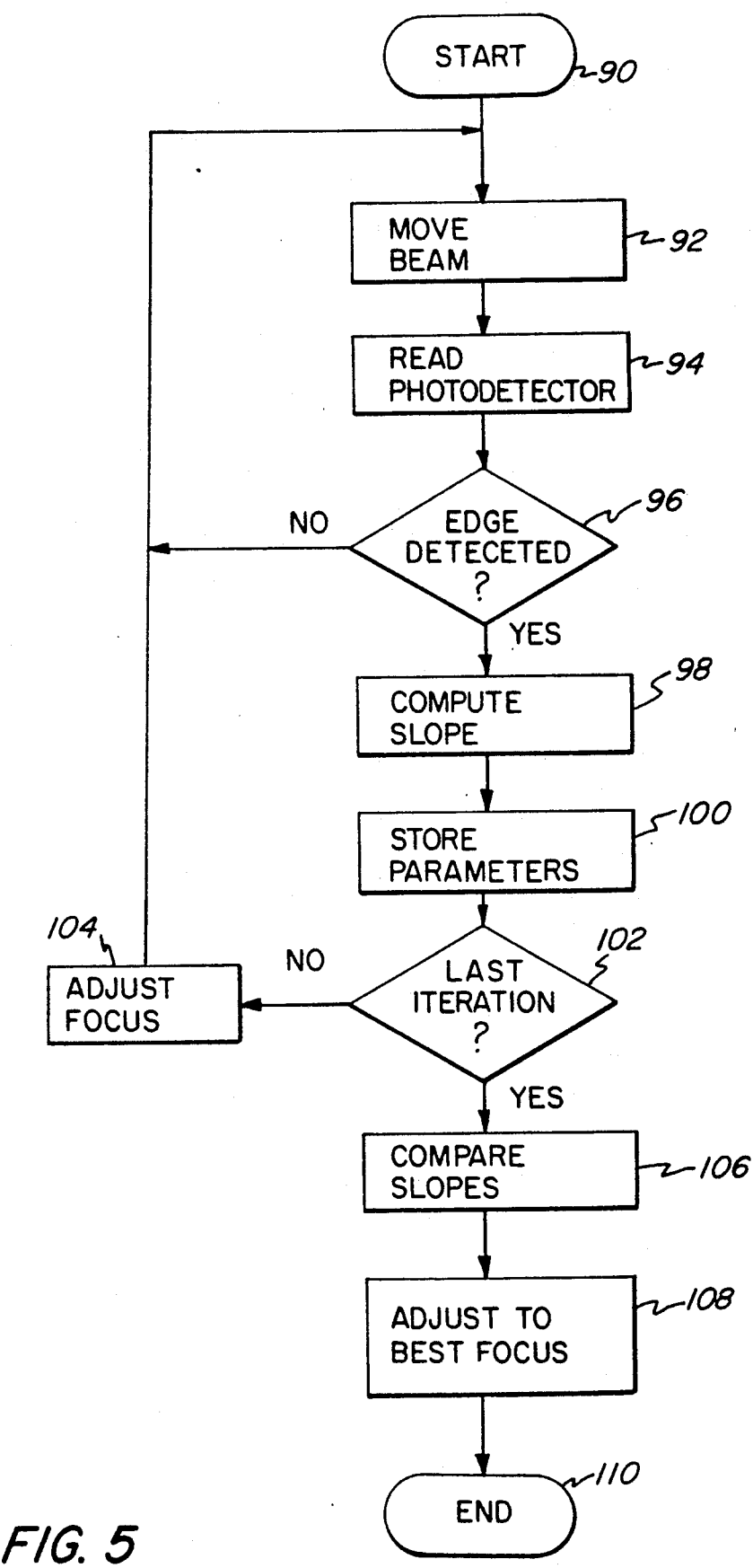
FIG. 5 is a flowchart illustrating a routine for adjusting focus based on an intensity profile.

An algorithm used by microcomputer 10 to provide the best focus is depicted in flowchart form in FIG. 5. The routine starts at box 90, and at box 92 beam scan processor 14 moves the CRT beam 46 to an edge of a sprocket hole 34. As indicated at box 94, photodetector 36 is read by intensity profile processor 40 until an edge is detected (box 96). At this point, control passes to box 98 where intensity profile processor 40 computes the slope of the intensity profile as the beam moves across the sprocket hole edge. At box 100, parameters identifying the calculated slope, as well as the focusing position of lens 44 and/or the signal used to drive beam focus circuitry 48 are stored.

At box 102, a determination is made as to whether intensity profile processor 40 has run through a predetermined number of focus iterations. If not, the lens and/or beam focus is readjusted at box 104, and the process repeats through successive iterations until the required number have been completed. Control then passes to box 106, where the intensity profile slopes of all iterations are compared to find the steepest one. As noted above, the steepest slope will result from the position of best focus. With this information, the best focus parameters (i.e., lens position and/or CRT focus signal) are retrieved and used to adjust the lens and/or CRT to the best focus position, as indicated at box 108. The routine then ends at box 110.

In an alternate embodiment, the use of a predetermined number of iterations is avoided by comparing the intensity profile of each successive focus adjustment to that of the prior setting. The slopes will get successively steeper to a point, and then start getting less steep. The focus setting immediately prior to the point at which the slopes start getting less steep will be the best focus. Other techniques of finding the steepest slope will be apparent to those skilled in the art.

It should now be appreciated that the present invention provides an automatic method and apparatus for precision image registration in a film recorder or similar apparatus without the need for expensive and complicated mechanical pin registration devices. Instead, the film is advanced by a conventional sprocket drive to a rough alignment position. The position of a fixed reference mark on an unused portion of the film, such as a sprocket hole, is determined by a photosensor that detects a spot scanned across the sprocket hole by the imaging CRT. The exact position of the film frame is computed from the point(s) at which the photosensor detects the scanning spot. The image to be projected by the CRT onto the film is then shifted on the CRT to provide proper placement on the film. Automatic focusing of both the beam and an optical lens in the beam path can also be provided by measuring the intensity profile of the beam as it crosses the sprocket hole edge.

Although the present invention has been described in connection with a particular embodiment, those skilled in the art will appreciate that numerous adaptations and modifications may be made thereto without departing from the spirit and scope of the invention, as set forth in the following claims.

What is claimed is:

1. Apparatus for registering an image on a recording medium comprising:

means for fixedly supporting a recording medium having an image area and a nonimage area in a rough registration position;

deflection means for scanning a beam across at least a portion of the nonimage area of said medium without impinging said image area;

means for detecting when said beam impinges at least one fixed reference mark in the nonimage area of said medium;

means responsive to said detecting means for computing translational and rotational coordinates from a plurality of locations at which said beam impinges said at least one mark;

means for computing a registration signal from said coordinates; and means responsive to said registration signal for controlling said deflection means to scan said beam across the image area of said recording medium to record information thereon in transversely and rotationally registered relation to said at least one reference mark.

2. Apparatus in accordance with claim 1 wherein said deflection means comprises a magnetic field source for scanning said beam without using moving optics.

3. Apparatus in accordance with claim 1 wherein said registration signal effects translational registration in a direction along a length of said recording medium.

4. Apparatus in accordance with claim 1 wherein said registration signal effects translational registration in a direction across a width of said recording medium.

5. Apparatus in accordance with claim 1 further comprising means for detecting a plurality of coordinates for identifying locations at which said beam impinges each of a plurality of fixed reference marks.

6. Apparatus in accordance with claim 1 wherein said deflection means comprises a deflection system of an image recorder used to record images on photographic film.

7. Apparatus in accordance with claim 6 further comprising:

a cathode ray tube for generating said beam.

8. Apparatus in accordance with claim 1 wherein said mark comprises an edge on said recording medium.

9. Apparatus in accordance with claim 1 wherein said mark comprises a sprocket hole provided in said recording medium.

10. Apparatus for registering an image on a recording medium comprising:

means for fixedly supporting a recording medium in a rough registration position, said recording medium having an image area and a nonimage area having a plurality of edges;

deflection means for scanning a beam across at least a portion of the nonimage area of said medium without impinging said image area;

means for detecting when said beam impinges at least one of said edges in the nonimage area of said medium;

means responsive to said detecting means for computing a coordinate identifying a location at which said beam impinges said at least one edge;

means for computing a registration signal from said coordinate;

means responsive to said registration signal for controlling said deflection means to scan said beam across the image area of said recording medium to record information thereon in registered relation to said at least one edge;

means for calculating an intensity profile of said beam as said beam is scanned across any of said edges in said nonimage area of said medium; and means for adjusting a focus of said beam according to sad intensity profile.

11. Apparatus in accordance with claim 10 wherein said adjusting means comprises means for reducing a diameter of said beam.

12. Apparatus in accordance with claim 10 wherein said adjusting means comprises means for varying a position of a lens along an axis of said beam.

13. A method for registering an image with respect to a stationary recording medium having an image area and a nonimage area, comprising the steps of:

roughly positioning said recording medium in a support;

scanning a beam across at least a portion of the nonimage area of said roughly positioned medium until said beam impinges a fixed reference mark on said nonimage area;

determining coordinates of said beam at the reference mark;

computing a registration signal from said coordinates; and scanning said beam across the image area of said roughly positioned recording medium in response to said registration signal to record information on said image area in rotationally registered relation to said reference mark.

14. A method in accordance with claim 13 wherein said information is registered with respect to said reference mark along a length of said recording medium.

15. A method in accordance with claim 14 wherein said information is registered with respect to said reference mark across a width of said recording medium.

16. A method in accordance with claim 13 wherein said information is registered with respect to said reference mark across a width of said recording medium.

17. A method in accordance with claim 13 comprising, prior to said step of scanning said beam across the image area, the further steps of:

scanning said beam across an edge on said recording medium;

calculating an intensity profile of said beam as it passes over said edge; and adjusting a focus of said beam according to said intensity profile to provide a focussed beam for recording information on said image area.

18. A method in accordance with claim 13 wherein the coordinates of said beam are determined at a plurality of fixed reference marks and used to compute said registration signal.

19. Apparatus for registering an image on a image frame of stationary, roughly positioned recording medium in a precision image recorder comprising:

means for fixedly supporting said recording medium in a rough registration position, said recording medium having an image area and a nonimage area;

means for generating a beam to expose an image on said image area;

digital processing means including a set of nominal scanning coordinates and coupled to said beam generating means for providing deflection signals to scan said beam across at least a portion of the nonimage area of said recording medium without exposing said image area;

means operatively associated with said digital processing means for detecting when said beam impinges at least one fixed reference mark in the nonimage area of said recording medium;

means responsive to said detecting means for computing reference coordinates from locations at which said beam impinges said at least one mark;

said digital processing means further including means for storing said reference coordinates and means for computing registration correction factors from said stored reference coordinates; and means operatively associated with said digital processing means for correcting said nominal scanning coordinates using said registration correction factors to provide corrected scanning coordinates, wherein said digital processing means are coupled to said beam generating means to expose an image on said image area using said corrected scanning coordinates.

20. Apparatus in accordance with claim 19 wherein said detecting means detect locations at which said beam impinges a plurality of different fixed reference marks in said nonimage area, for use by said digital processing means in computing said registration correction factors to provide corrected scanning coordinates for a single image frame.

21. Apparatus in accordance with claim 20 wherein said plurality of fixed reference marks comprise a plurality of different sprocket holes on said recording medium.

* * * * *